United States Patent
Österling et al.

(10) Patent No.: US 11,716,653 B2
(45) Date of Patent: Aug. 1, 2023

(54) MANAGEMENT OF UPLINK TRANSMISSION IN O-RAN, TRANSPORT PATH GROUP

(71) Applicant: Telefonaktiebolaget LM Ericsson (publ), Stockholm (SE)

(72) Inventors: Jacob Österling, Järfälla (SE); Murali Krishna Srinivasan, Stockholm (SE); Lars Hennert, Spånga (SE); Göran Knutson, Vendelsö (SE); Patrik Nordensky, Farsta (SE); Michael Persson, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/570,944

(22) Filed: Jan. 7, 2022

(65) Prior Publication Data

US 2022/0232419 A1    Jul. 21, 2022

Related U.S. Application Data

(60) Provisional application No. 63/139,762, filed on Jan. 20, 2021.

(51) Int. Cl.
*H04W 28/08* (2023.01)
*H04L 45/24* (2022.01)
(Continued)

(52) U.S. Cl.
CPC ......... *H04W 28/0858* (2020.05); *H04L 45/24* (2013.01); *H04W 28/20* (2013.01); *H04W 40/02* (2013.01); *H04L 12/4641* (2013.01)

(58) Field of Classification Search
CPC ............... H04L 45/24; H04L 12/4641; H04W 28/0858; H04W 28/20; H04W 40/02
See application file for complete search history.

(56) References Cited

U.S. PATENT DOCUMENTS

2021/0127351 A1* 4/2021 Stojanovski .......... H04W 48/16

OTHER PUBLICATIONS

O-RAN Alliance e.V., "O-RAN Fronthaul Working Group Control, User and Synchronization Plane Specification", O-RAN.WG4.CUS.0-v04.00, Technical Specification, 2020 (258 pages).
(Continued)

*Primary Examiner* — Jianye Wu
(74) *Attorney, Agent, or Firm* — Rothwell, Figg, Ernst & Manbeck, P.C.

(57) ABSTRACT

A transport path group for uplink transmission over a fronthaul interface. The transport path group may include (i) an address of a first source port of a radio unit (RU), (ii) an address of a first destination port of a distributed unit (DU), and (iii) an address of a second source port of the RU, an address of a second destination port of the DU, and/or a flow identifier (e.g., a virtualized local area network (VLAN)). A request for user data conveyed by the DU and received by the RU may identify the transport path group. The RU may use the fronthaul interface to convey to the DU first and second portions of the requested user data over first and second different paths from the RU to the DU. The RU may employ load balancing parameters to convey the first and second portions of the requested user data.

20 Claims, 9 Drawing Sheets

(51) Int. Cl.
*H04W 28/20* (2009.01)
*H04W 40/02* (2009.01)
*H04L 12/46* (2006.01)

(56) References Cited

OTHER PUBLICATIONS

O-RAN Alliance e.V., "O-RAN Fronthaul Working Group Control, User and Synchronization Plane Specification", O-RAN.WG4.CUS.0-v03.00, Technical Specification, 2020 (253 pages).
O-RAN Alliance e.V., "O-RAN Alliance Working Group 4 Management Plane Specification", O-RAN.WG4.MP.0-v04.00, Technical Specification, 2020 (183 pages).

* cited by examiner

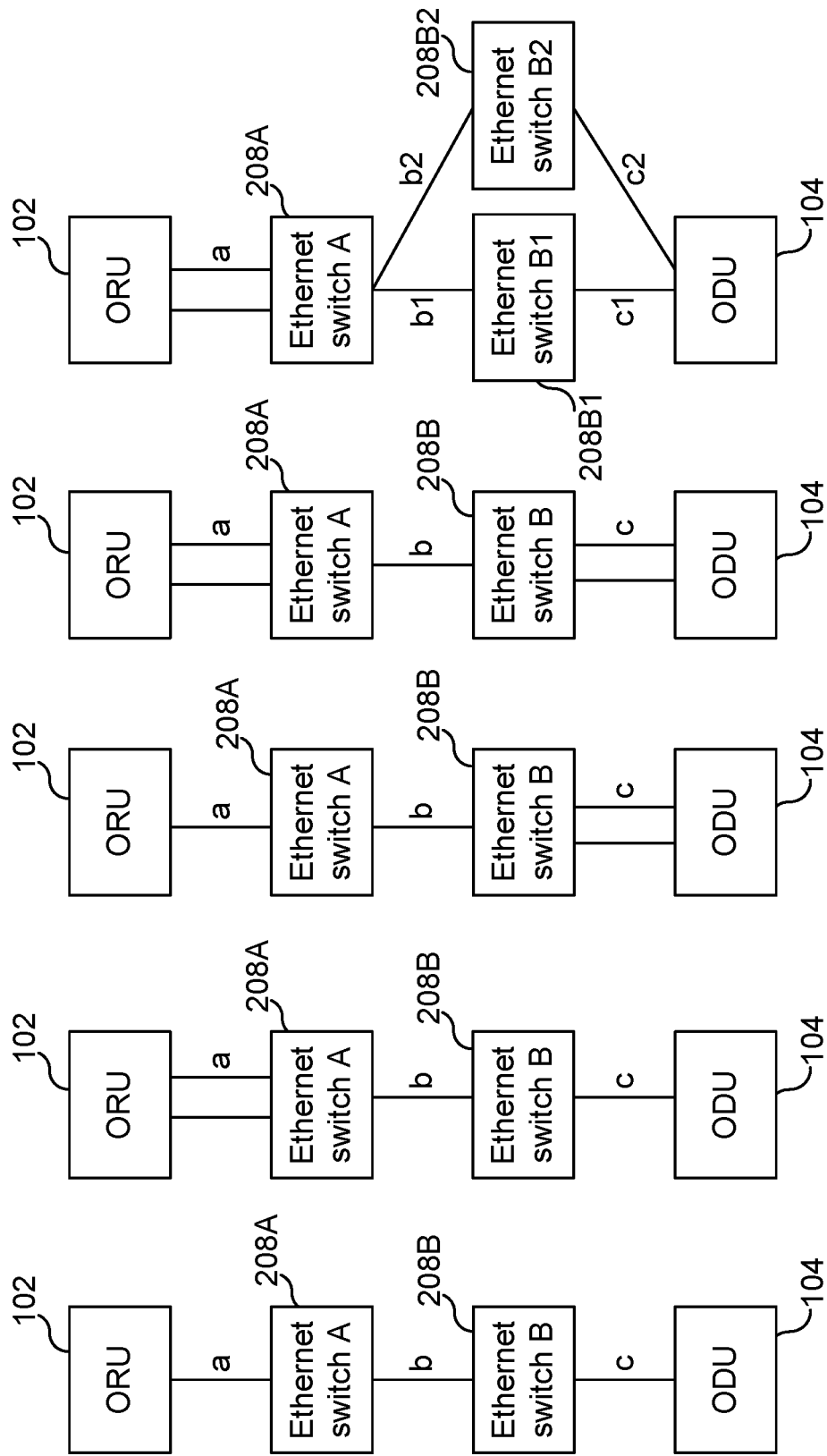

MANAGEMENT OF UPLINK TRANSMISSION IN O-RAN, TRANSPORT PATH GROUP

CROSS-REFERENCE TO RELATED APPLICATION

The present application claims the benefit of priority to U.S. Provisional Application Ser. No. 63/139,762, filed on Jan. 20, 2021, which is incorporated herein by reference in its entirety.

TECHNICAL FIELD

Disclosed are embodiments related to a transport path group for uplink transmission over a fronthaul interface.

BACKGROUND

In a mobile communication RAN (Radio Access Network) system, the interface between a radio unit (RU) (e.g., a remote radio head (RRH) or a remote radio unit (RRU)) and a distributed unit (DU) (e.g., a baseband unit (BBU) or baseband processing part) is called the fronthaul interface (or fronthaul network). The O-RAN Alliance has in Working Group 4 specified an open and interoperability capable fronthaul protocol in a Control-, User- and Synchronization Plane (CUS) Plane Specification. See CUS Specification v04.00, July 2020, 0-RAN Alliance. See also Management Plane Specification v.04.00, August 2020, O-RAN Alliwance. The traffic in uplink (UL) direction (i.e., from RU to DU) on the fronthaul interface is scheduled by the DU. An RU does not spontaneously send any user data on the interface.

The user data interface is very high bit rate, and sometimes multiple paths are necessary to convey the data. In addition, redundant links may be used to reduce the outage if one link or equipment fails.

SUMMARY

Certain challenges presently exist with respect to existing solutions for the distribution of uplink (UL) user data traffic between paths through the fronthaul interface. First, the ORAN Fronthaul Working Group's Control, User, and Synchronization Plane Specification includes only a very limited mechanism for distributing UL user data traffic between paths through the fronthaul interface. The only method is to explicitly subdivide a user plane (U-plane) request into multiple requests, where each request can then utilize a special path. This reduces the efficiency in the communication as request control messages needs to be repeated. Second, there is no support in commercial ethernet switches to conduct load balancing on a single media access control (MAC) flow.

Aspects of the invention may overcome one or more of the problems with the existing solution by introducing a new concept, called a transport path group. The transport path group may include one or more source addresses and one or more destination addresses. The addresses may be Internet Protocol (IP) addresses or MAC addresses. The transport path group may additionally include a flow identifier (e.g., a virtualized local area network (VLAN)).

In some embodiments, a distributed unit (DU) may use an extended antenna-carrier (eAxC) identification (ID) in the control plane (C-plane) to identify which transport path group to use, and the radio unit (RU) may use two or more paths of the identified transport path group to convey user data to the DU. In some embodiments, the relationship between eAxC IDs to transport path groups may be setup using the management plane (M-plane). In some embodiments, the RU may distribute the user data over multiples paths of the identified transport path group (e.g., to evenly distribute the load over the available paths of the identified transport path group or to use one or more paths more heavily). In some embodiments, the RU may distribute data over paths of the identified transport path group according to load balancing parameters (e.g., relative bitrates and/or load balancing weights).

Aspects of the invention may provide one or more of the following advantages: load balancing over multiple ports at the RU, load balancing over multiple ports at the DU, load balancing over multiple intermediate paths in the fronthaul interface, load balancing to have lower rate interfaces, and/or load balancing to simplify aggregation of multiple flows (e.g., having multiple RUs connected to the same ODU).

In some embodiments, by defining a set of paths to be used for an ORAN UL U-plane request rather than just a single one, an RU may convey messages generated by the UL U-plane via multiple paths through the fronthaul network. This may provide the advantage of allowing lower cost of the fronthaul network as traffic can be engineered.

In some embodiments, aspects of the invention may be realized by introducing the transport path group concept in the ORAN LLS specification.

One aspect of the invention may provide a method performed by a distributed unit (DU). The method may include conveying a request for user data to a radio unit (RU). The request for user data may identify a transport path group. The transport path group may include (i) an address of a first source port of the RU, (ii) an address of a first destination port of the DU, and (iii) an address of a second source port of the RU, an address of a second destination port of the DU, and/or a flow identifier. The method may include receiving a first portion of the requested user data conveyed by the RU over a first path from the first source port of the RU to the first destination port of the DU. The method may include receiving a second portion of the requested user data conveyed by the RU over a second path from a source port of the RU to a destination port of the DU. The source port of the second path may be one of the first and second source ports. The destination port may be one of the first and second destination ports. The second path may be different than the first path.

In some embodiments, the flow identifier may be a virtualized local area network (VLAN).

In some embodiments, the request for user data may include a data associated control message. In some embodiments, the request for user data may include an extended antenna-carrier (eAxC) identification (ID). In some embodiments, the request for user data may include load balancing weights for the first and second paths. In some embodiments, the addresses of the first and second source ports of the RU and the first and second destination ports of the DU may be Internet Protocol (IP) addresses or media access control (MAC) addresses.

In some embodiments, the transport path group may include the address of the second source port of the RU. In some embodiments, the second path may be from the second source port of the RU to the first destination port of the DU. In some embodiments, the transport path group may include the address of the second destination port of the DU, and the second path may be from the second source port of the RU to the second destination port of the DU. In some embodiments, the method may further include receiving a third portion of the requested user data conveyed by the RU over a third path from the first source port of the RU to the second destination port of the DU. In some embodiments, the method may further include receiving a fourth portion of the requested user data conveyed by the RU over a fourth path from the second source port of the RU to the first destination port of the DU.

In some embodiments, the transport path group may include the address of the second destination port of the DU, and the second path may be from the first source port of the RU to the second destination port of the DU.

In some embodiments, the transport path group may include the flow identifier. In some embodiments, the flow identifier may subdivide the first portion of the requested user data on the first path between a first switch and a second switch.

In some embodiments, the first path may be through a first switch but not a second switch, and the second path may be through the second switch but not the first switch. In some embodiments, the second path may be from the second source port of the RU, through the second switch, and to the second destination portion of the DU. In some embodiments, the second switch may serve more RUs than the first switch, and the first portion of the requested user data conveyed by the RU over the first path through the first switch may be larger than the second portion of the requested user data conveyed by the RU over the second path through the second switch. In some embodiments, the first and second switches may be Ethernet switches.

In some embodiments, the first and second portions of the requested user data may be received at the same rate. In some embodiments, the first portion of the requested user data may be received at a different rate than the rate at which the second portion of the requested used data is received.

In some embodiments, the RU may be a first RU, and the method may further include conveying a request for second user data to a second RU. The request for second user data may identify a second transport path group. The second transport path group may include (i) an address of a first source port of the second RU, (ii) the address of the first destination port of the DU, and (iii) an address of a second source port of the second RU, the address of the second destination port of the DU, and/or a flow identifier (e.g., a VLAN). The method may include receiving a first portion of the requested second user data conveyed by the second RU over a first path from the first source port of the second RU to the first destination port of the DU. The method may include receiving a second portion of the requested second user data conveyed by the second RU over a second path from a source port of the second RU to a destination port of the DU. The source port of the second path may be one of the first and second source ports of the second RU. The destination port may be one of the first and second destination ports of the DU, and the second path may be different than the first path.

In some embodiments, the method may further include conveying a configuration for the transport path group to the RU. In some embodiments, the method may further include receiving a configuration for the transport path group, and the configuration for the transport path group may have been conveyed by a management node.

In some embodiments, the method may further include conveying load balancing parameters for the transport path group to the RU. In some embodiments, the load balancing parameters may include relative bitrates for the first and second paths. In some embodiments, the load balancing parameters may include load balancing weights for the first and second paths.

In some embodiments, the DU may be a baseband unit.

Another aspect of the invention may provide a distributed unit (DU). The DU may be adapted to convey a request for user data to a radio unit (RU). The request for user data may identify a transport path group. The transport path group may include (i) an address of a first source port of the RU, (ii) an address of a first destination port of the DU, and (iii) an address of a second source port of the RU, an address of a second destination port of the DU, and/or a flow identifier (e.g., a virtualized local area network (VLAN)). The DU may be adapted to receive a first portion of the requested user data conveyed by the RU over a first path from the first source port of the RU to the first destination port of the DU. The DU may be adapted to receive a second portion of the requested user data conveyed by the RU over a second path from a source port of the RU to a destination port of the DU. The source port of the second path may be one of the first and second source ports. The destination port may be one of the first and second destination ports. The second path may be different than the first path.

Still another aspect of the invention may provide a method performed by a radio unit (RU). The method may include receiving a request for user data conveyed by a distributed unit (DU). The request for user data may identify a transport path group. The transport path group may include (i) an address of a first source port of the RU, (ii) an address of a first destination port of the DU, and (iii) an address of a second source port of the RU, an address of a second destination port of the DU, and/or a flow identifier (e.g., a virtualized local area network (VLAN)). The method may include conveying a first portion of the requested user data over a first path from the first source port of the RU to the first destination port of the DU. The method may include conveying a second portion of the requested user data over a second path from a source port of the RU to a destination port of the DU. The source port of the second path may be one of the first and second source ports. The destination port may be one of the first and second destination ports. The second path may be different than the first path.

In some embodiments, the flow identifier may be a virtualized local area network (VLAN).

In some embodiments, the RU may distribute the requested data evenly over multiple paths from the RU to the DU, and the multiple paths may include the first and second paths. In some embodiments, the method may further include receiving multiple requests for user data from the DU, the RU may distribute the user data requested by the multiple requests over multiple paths from the RU to the DU, and the multiple paths may include the first and second paths.

In some embodiments, the request for user data may include a data associated control message. In some embodiments, the request for user data may include an extended antenna-carrier (eAxC) identification (ID). In some embodiments, the addresses of the first and second source ports of the RU and the first and second destination ports of the DU may be Internet Protocol (IP) addresses or media access control (MAC) addresses.

In some embodiments, the transport path group may include the address of the second source port of the RU. In some embodiments, the second path may be from the second source port of the RU to the first destination port of the DU. In some embodiments, the transport path group may include the address of the second destination port of the DU, and the second path may be from the second source port of the RU to the second destination port of the DU. In some embodiments, the method may further include conveying a third portion of the requested user data over a third path from the first source port of the RU to the second destination port of the DU. In some embodiments, the method may further include conveying a fourth portion of the requested user data over a fourth path from the second source port of the RU to the first destination port of the DU.

In some embodiments, the transport path group may include the address of the second destination port of the DU, and the second path may be from the first source port of the RU to the second destination port of the DU.

In some embodiments, the transport path group may include the flow identifier. In some embodiments, the flow identifier may subdivide the first portion of the requested user data on the first path between a first switch and a second switch.

In some embodiments, the first path may be through a first switch but not a second switch, and the second path may be through the second switch but not the first switch. In some embodiments, the second path may be from the second source port of the RU, through the second switch, and to the second destination portion of the DU. In some embodiments, the second switch may serve more RUs than the first switch, and the first portion of the requested user data conveyed by the RU over the first path through the first switch may be larger than the second portion of the requested user data conveyed by the RU over the second path through the second switch. In some embodiments, the first and second switches may be Ethernet switches.

In some embodiments, the first and second portions of the requested user data may be conveyed at the same rate. In some embodiments, the first portion of the requested user data may be conveyed at a different rate than the rate at which the second portion of the requested used data is conveyed.

In some embodiments, the method may further include receiving a configuration for the transport path group. In some embodiments, the configuration for the transport path group may have been conveyed by the DU. In some embodiments, the configuration for the transport path group may have been conveyed by a management node.

In some embodiments, the method may include using load balancing parameters to convey the first and second portions of the requested user data over the first and second paths, respectively, from the RU to the DU. In some embodiments, the method may include receiving the load balancing parameters for the transport path group. In some embodiments, the method may include determining the load balancing parameters for the transport path group. In some embodiments, the load balancing parameters may include relative bitrates for the first and second paths. In some embodiments, the load balancing parameters may include load balancing weights for the first and second paths.

In some embodiments, the method may further include determining that a single path would be insufficient to convey the requested user data during a transmission window, the first and second data portions may be conveyed over the first and second paths, respectively, in response to determining that a single path would be insufficient to convey the requested user data during the transmission window. In some embodiments, determining that a single path would be insufficient to convey the requested user data during the transmission window may include determining that a data rate of one or more source ports of the RU is insufficient to convey the requested user data during the transmission window.

In some embodiments, the DU may be a baseband unit.

Yet another aspect of the invention may provide a radio unit (RU). The RU may be adapted to receive a request for user data conveyed by a distributed unit (DU). The request for user data may identify a transport path group. The transport path group may include (i) an address of a first source port of the RU, (ii) an address of a first destination port of the DU, and (iii) an address of a second source port of the RU, an address of a second destination port of the DU, and/or a flow identifier (e.g., a virtualized local area network (VLAN)). The RU may be adapted to convey a first portion of the requested user data over a first path from the first source port of the RU to the first destination port of the DU. The RU may be adapted to convey a second portion of the requested user data over a second path from a source port of the RU to a destination port of the DU. The source port of the second path may be one of the first and second source ports. The destination port may be one of the first and second destination ports. The second path may be different than the first path.

Yet another aspect of the invention may provide a method performed by a management node. The method may include determining a configuration for a transport path group. The transport path group may include (i) an address of a first source port of a radio unit (RU), (ii) an address of a first destination port of a distributed unit (DU), and (iii) an address of a second source port of the RU, an address of a second destination port of the DU, and/or flow identifier (e.g., a virtualized local area network (VLAN)). The method may include conveying the configuration for the transport path group to the RU and/or the DU.

Still another aspect of the invention may provide a management node. The management node may be adapted to determine a configuration for a transport path group. The transport path group may include (i) an address of a first source port of a radio unit (RU), (ii) an address of a first destination port of a distributed unit (DU), and (iii) an address of a second source port of the RU, an address of a second destination port of the DU, and/or a flow identifier (e.g., a virtualized local area network (VLAN)). The management node may be adapted to convey the configuration for the transport path group to the RU and/or the DU.

Yet another aspect of the invention may provide a computer program including instructions for adapting an apparatus to perform any of the methods set forth above. Still another aspect of the invention may provide a carrier containing the computer program, and the carrier may be one of an electronic signal, optical signal, radio signal, or compute readable storage medium.

Still another aspect of the invention may provide an apparatus including processing circuitry and a memory. The memory containing instructions executable by the processing circuitry, whereby the apparatus is operative to perform any of the methods set forth above. Yet another aspect of the invention may provide an apparatus adapted to any of the methods set forth above.

Still another aspect of the invention may provide any combination of the aspects set forth above.

BRIEF DESCRIPTION OF THE DRAWINGS

The accompanying drawings, which are incorporated herein and form part of the specification, illustrate various embodiments.

FIGS. 2A-2F illustrate examples of fronthaul network topology according to some embodiments.

DETAILED DESCRIPTION

Embodiments of this application are described in the context of New Radio (NR or 5G). However, the embodiments are also applicable to other radio access technologies (e.g., Long Term Evolution (LTE)).

Figure 1:
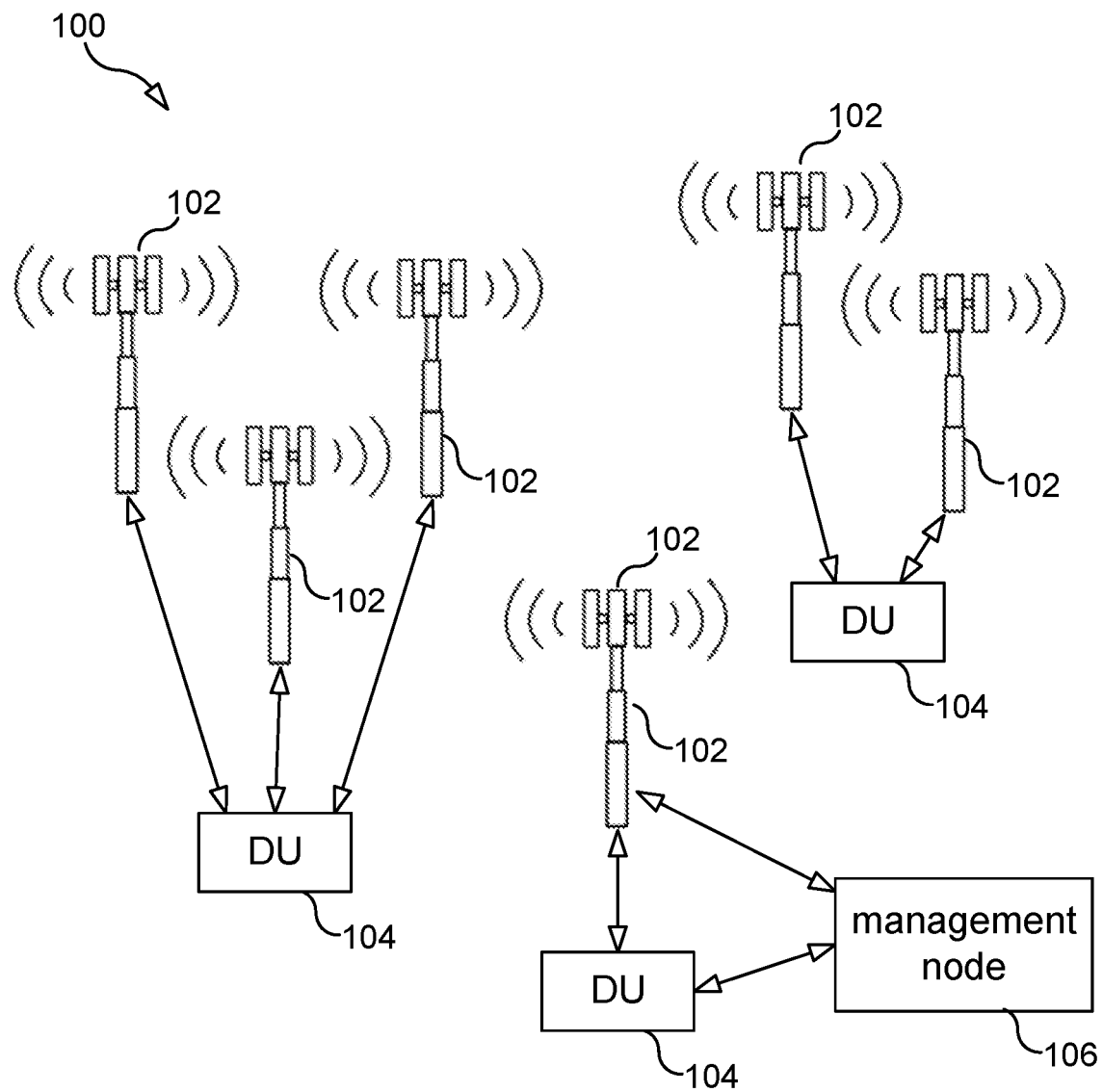
FIG. 1 illustrates a system 100 according to some embodiments.

FIG. 1 illustrates a system 100 according to some embodiments. In some embodiments, the system 100 may include one or more radio units (RUs) 102, one or more distributed units (DUs) 104, and one or more manager nodes 106. In some embodiments, an RU 102 may be, for example and without limitation, a remote radio head (RRH) or a remote radio unit (RRU). In some embodiments, the RU 102 may be an O-RAN RU (ORU). In some embodiments, a DU 104 may be, for example and without limitation, a baseband unit (BBU) or baseband processing part. In some embodiments, the DU 104 may be an O-RAN DU (ODU). In some embodiments, one or more of the RUs 102 and one or more of the DUs 104 may be part of a base station, which may be, for example and without limitation, a Next Generation (NG) RAN (NG-RAN) base station (denoted "gNB"). In some embodiments, a DU 104 may serve one or more RUs 102. In some embodiments, a fronthaul interface may link an RU 102 and a DU 104. In some embodiments, an RU 102 may have multiple source ports (e.g., two, four, or more source ports, and a DU 104 may have multiple destination ports (e.g., two, four, or more destination ports). In some embodiments, a management node 106 may communicate with a DU 104 over a management plane (M-plane). In some embodiments, the management node 106 may communicate with an RU 102 directly (e.g., under a hybrid M-plane model) and/or indirectly (e.g., via a DU 104 under a hierarchical M-plane model).

FIGS. 2A-2F illustrate examples of fronthaul network topology according to some embodiments. In some embodiments, the fronthaul interface may include one or more switches 208. In some embodiments, the switches 208 may be, for example and without limitation, Ethernet switches. In some embodiments, a path from an RU 102 to a DU 104 may pass through one or more switches 208. Although paths from the RU 102 to the DU 104 in the examples illustrated in FIGS. 2A-2E pass through two switches 208, this is not required, and paths from the RU 102 to the DU 104 may pass through fewer or more than two switches 208.

FIG. 2A illustrates an example in which an RU 102 conveys requested user data over one path from a source port of the RU 102 to a first destination port of the DU 104. An interface a connects the source port of the RU 102 to a switch 208A, which may be at the antenna site. An interface b connects the switch 208A to a switch 208B, which may be at the centralized radio access network (CRAN). An interface c connects the switch 208B to the destination port of the DU 104. This basic example is supported by the existing ORAN specification. If interfaces a, b, and c have high enough bitrate to serve the carriers of the RU 102, the existing ORAN specification works. The DU 104 selects the path by indicating a flow identifier (e.g., a virtualized local area network (VLAN)) and address (e.g., MAC address) of the destination port of the DU 104, and the RU 102 generates the user plane (U-plane) messages.

Unlike the example in FIG. 2A, the existing ORAN specification does not support the examples in FIGS. 2A-2E. In the example illustrated in FIG. 2B, the DU 104 identifies a transport path group that includes (i) an address of a first source port of the RU 102, (ii) an address of a second source port of the RU 102, and (iii) an address of a first destination port of the DU 104. The RU 102 conveys (and the DU 104 receives) a first portion of requested user data over a first path from the first source port of the RU 102 to the first destination port of the DU 102, and the RU 102 conveys (and the DU 104 receives) a second portion of the requested user data over a second path from the second source port of the RU 102 to the first destination port of the DU 102.

The example illustrated in FIG. 2B works even if the RU 102 does not have enough bitrate on its source ports to fit the all of the requested content of the U-plane on the same source port. For instance, if the source ports of the RU 102 are 10 Gbps interfaces, and the U-plane request would require a 15 Gbps interface to convey the entire U-plane request in a single transmission window using a single source port, the entire U-plane request could be transmitted in a single transmission window using two (or more) source ports.

In some embodiments, the RU 102 may be configured (e.g., by default, by the DU 104, or by the management node 106) to have equal load balancing weight, or the RU 102 may be configured to select to use one path more than the other (e.g., if synchronization or M-plane should be placed on one of them, thus offsetting the balancing).

In the example illustrated in FIG. 2C, the DU 104 identifies a transport path group that includes (i) an address of a first source port of the RU 102, (ii) an address of a first destination port of the DU 104, and (iii) an address of a second destination port of the DU 104. The RU 102 conveys (and the DU 104 receives) a first portion of requested user data over a first path from the first source port of the RU 102 to the first destination port of the DU 102, and the RU 102 conveys (and the DU 104 receives) a second portion of the requested user data over a second path from the first source port of the RU 102 to the second destination port of the DU 102.

The configuration illustrated in FIG. 2C may be used, for example, when the DU 104 does not have enough bitrate on its ports to receive the whole U-plane on a single destination port in a single transmission window. For instance, if the destination ports of the RU 102 are 10 Gbps interfaces, and the U-plane request would require a 15 Gbps interface to convey the entire U-plane request in a single transmission window using a single destination port, the entire U-plane request could be transmitted in a single transmission window using two (or more) destination ports. Here again, the RU 102 may be configured (e.g., by default, by the DU 104, or by the management node 106) to have equal load balancing weight, or the RU 102 may be configured to select to use one path more than the other.

In some embodiments, a DU 104 may serve multiple RUs 102 (e.g., tens or hundreds of RUs 102). In some embodiments, the ability to identify more than one destination port of the DU 104 may be used to avoid an unbalanced load on any particular interface c to a destination port of the DU 104. When requesting user data from the multiple RUs 102, the DU 104 may identify a transport path groups that include the addresses of multiple (e.g., two, more than two, or all) destination ports of the DU 104. The DU 104 may then securely schedule multiple RUs 102 to simultaneously send uplink (UL) U-plane data, and the data may be received fairly averaged on the multiple destination ports.

In the example illustrated in FIG. 2D, the DU 104 identifies a transport path group that includes (i) an address of a first source port of the RU 102, (ii) an address of a second source port of the RU 102, (iii) an address of a first destination port of the DU 104, and (iv) an address of a second destination port of the DU 104. By doing so, the RU 102 may have four paths available to convey the UL data. For instance, the RU may convey (and the DU 104 may receive) (i) a first portion of requested user data over a first path from the first source port of the RU 102 to the first destination port of the DU 102, (ii) a second portion of the requested user data over a second path from the first source port of the RU 102 to the second destination port of the DU 102, (iii) a third portion of the requested user data over a third path from the second source port of the RU 102 to the first destination port of the DU 102, and/or (iv) a fourth portion of the requested user data over a fourth path from the second source port of the RU 102 to the second destination port of the DU 102.

In the example illustrated in FIG. 2E, the DU 104 identifies a transport path group that includes (i) an address of a first source port of the RU 102, (ii) an address of a second source port of the RU 102, (iii) an address of a first destination port of the DU 104, and (iv) an address of a second destination port of the DU 104. In accordance with the identified transport path group, the RU 102 may, for example, convey (and the DU 104 receives) a first portion of requested user data over a first path from the first or second source port of the RU 102 to the first destination port of the DU 102 that passes through a first switch 208B1 and (ii) a second portion of the requested user data over a second path from the first or second source port of the RU 102 to the second destination port of the DU 102 through a second switch 208B2. In this example, although the transport path group may include a flow identifier (e.g., a VLAN), it is not necessary that the transport path group include a flow identifier because there is no ambiguity with respect to the paths. That is, any path to the first destination port of the DU 104 (regardless of whether the path is from the first source port of the RU 102 or the second source port of the RU 102) will pass through the first switch 208B1, and any path to the second destination port of the DU 104 (regardless of whether the path is from the first source port of the RU 102 or the second source port of the RU 102) will pass through the second switch 208B2.

In the example illustrated in FIG. 2E, there are multiple possible paths through the fronthaul network (FHNW) (e.g., due to removing single-point of failures). An interface b1 may connect the switch 208A and the first switch 208B1, and an interface b2 may connect the switch 208A and the second switch 208B2. In some embodiments, the interfaces b1 and b2 may take different directions in a fiber ring. In some embodiments, during exception cases where the first switch 208B1 or the second switch 208B2 is out of service, or interface b1 or b2 is broken, the traffic can continue but at a reduced capacity. In some embodiments, the dimensioning may be configured to have as little redundant bitrate during normal operation as possible (e.g., the demand on interface b1 plus the demand on interface b2 may be configured to be as close to the demand on switch 208B in FIG. 2A as possible). To achieve this, each RU 102 may be configured to use both interfaces b1 and b2, at a similar rate, as this would reduce the fragmentation otherwise seen (comparing with fixed allocation per RU 102 to either interface b1 or b2). In some embodiments, the transport path group may be used to configure up to many paths by the combination of source port address, destination port address, and/or flow identifier (e.g., VLAN), where the flow identifier may be used to subdivide the flows between switches 208B1 and 208B2.

In some embodiments, in the example illustrated in FIG. 2E, only a subset of the available paths of the identified transport path group may be used. For example, data may be conveyed using only a first path from a first source port of the RU 102 to a first destination port of the DU 104 through the first switch 208B1 and a second path from a second source port of the RU 102 to a second destination port of the DU 104 through the second switch 208B2 (e.g., in the case of equal bit rate on each interface). In this example, the RU 102 neither uses an available third path from the first source port of the RU 102 to the second destination port of the DU 104 nor an available fourth path from the second source port of the RU 102 to the first destination port of the DU 104.

Figure 2F:
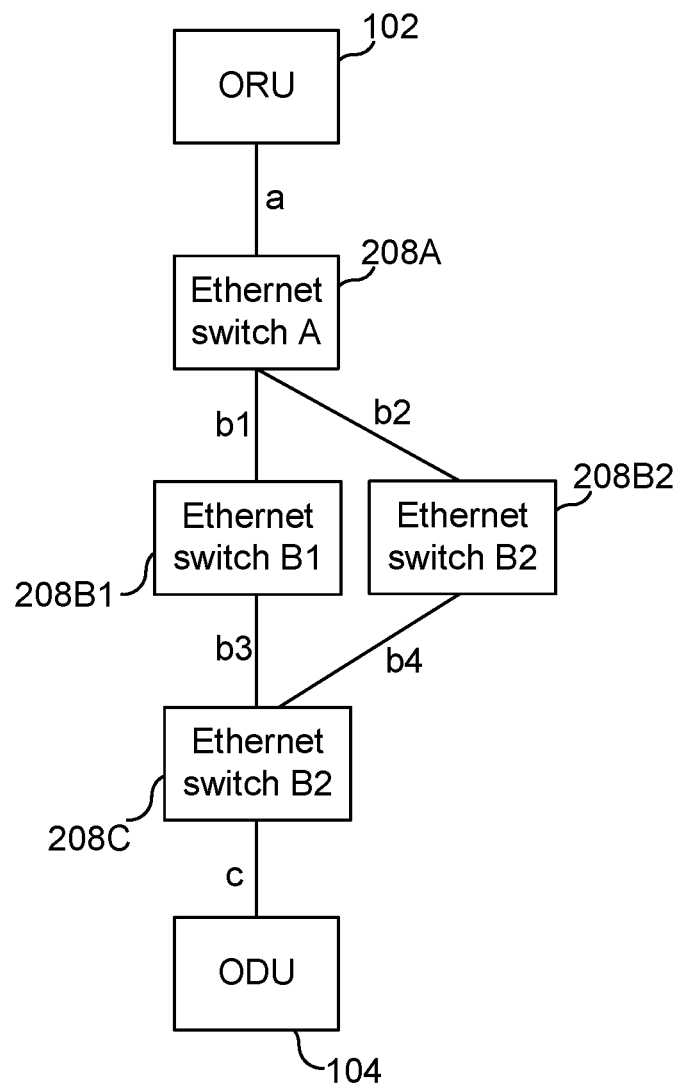

In the example illustrated in FIG. 2F, the DU 104 may identify a transport path group that includes (i) an address of a first source port of the RU 102, (ii) an address of a first destination port of the DU 104, and (iii) a flow identifier. In some aspects, the flow identifier may be, for example, a VLAN. An interface b1 may connect the switch 208A and the first switch 208B1, and an interface b2 may connect the switch 208A and the second switch 208B2. An interface b3 may connect the switch 208B1 and a switch 208C, and an interface b4 may connect the switch 208B2 and the switch 208C. In some embodiments, an interface c may connect the switch 208c and the distributed unit 104. In accordance with this identified transport path group, the RU 102 may, for example, convey (and the DU 104 receives) a first portion of requested user data over a first path from the first source port of the RU 102 to the first destination port of the DU 102 that passes through the first switch 208B1 and (ii) a second portion of the requested user data over a second path from the first source port of the RU 102 to the first destination port of the DU 102 through the second switch 208B2. In this example, because ambiguity would exist for paths defined only by their source and destination ports, it is necessary for the transport path group to include the flow identifier to deliberately control switching of the message. That is, in the example shown in FIG. 2E, a path from the first source port of the RU 102 to the second source port of the DU 104 could go through either switch 208B1 or switch 208B2. The flow identifier would be necessary to control whether the messages go on the path through the switch 208B1 or on the path through switch 208B2 (e.g., to control whether the messages all go through one of the switches 208B1 or 208B1 or to divide the messages between the switches 208B1 or 208B1.

In some embodiments, load balancing parameters may be used to handle multiple cases. For instance, load balancing parameters may be used to handle the case when all ports are not of equal speed. In the example illustrated in FIG. 2C, if the two interfaces c connecting the switch 208B and the DU 104 are of different rate, the RU 102 may send data at different rates on the different paths of the transport path group.

Load balancing parameters may additionally or alternatively take into account other traffic. For instance, if switch 208B2 serve more RUs 102 than switch 208B1, then an RU 102 with the possibility to convey data over one or more paths through switch 208B1 and one or more paths through switch 208B2 may choose to convey a bigger portion of the data on one or more paths through switch 208B1 (relative to the portion of the data the RU 102 conveys on one or more paths through switch 208B2).

Figure 3:
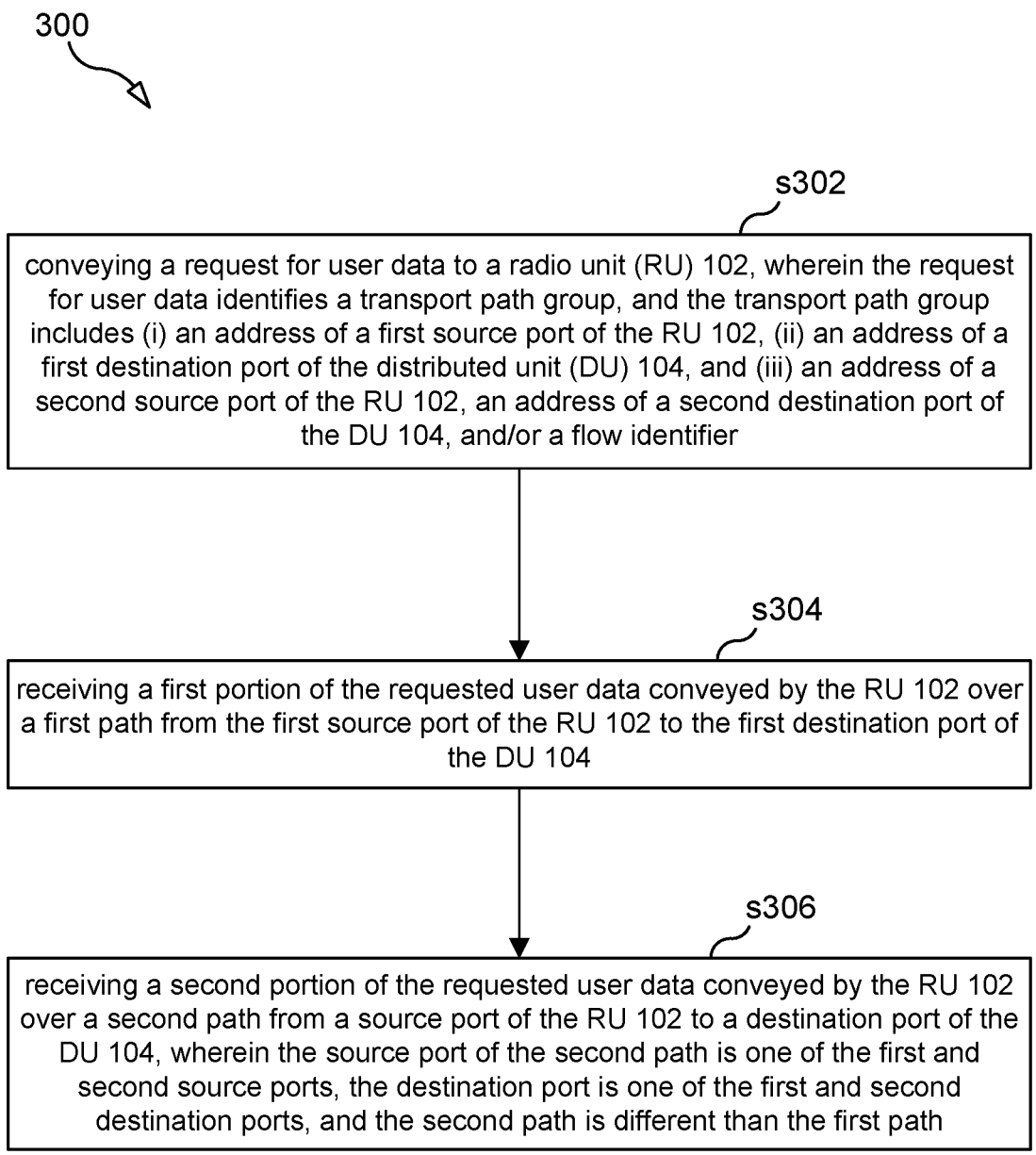
FIG. 3 is a flowchart illustrating a process according to some embodiments.

FIG. 3 illustrates a process 300 performed by a distributed unit (DU) 104. In some embodiments, the DU 104 may connected to one or more radio units (RUs) 102 over a fronthaul interface. In some embodiments, the DU 104 may be a baseband unit.

In some embodiments, the process 300 may include a step 302 in which the DU 104 conveys a request for user data to an RU 102. The request for user data may identify a transport path group. In some embodiments, the request for user data may include an identification of a transport path group. In some embodiments, the request for user data may include an extended antenna-carrier (eAxC) identification (ID). In some embodiments, a transport path group may be associated with the eAxC ID, and the eAxC ID may identify the transport path group that is associated with the eAxC ID. In some embodiments, the request for user data may include a data associated control message.

In some embodiments, the transport path group may include (i) an address of a first source port of the RU 102, (ii) an address of a first destination port of the DU 104, and (iii) an address of a second source port of the RU 102, an address of a second destination port of the DU 104, and/or a flow identifier (e.g., a virtualized local area network (VLAN)). The second source port may be a different source port of the RU 102 than the first source port, and the second destination port may be a different destination port of the DU 104 than the first destination port. In some embodiments, the addresses of the first and second source ports of the RU 102 and the first and second destination ports of the DU 104 may be Internet Protocol (IP) addresses or media access control (MAC) addresses. In some embodiments, the request for user data may include load balancing weights for the first and second paths.

In some embodiments, the process 300 may include a step 304 in which the DU 104 receives a first portion of the requested user data conveyed by the RU 102 over a first path from the first source port of the RU 102 to the first destination port of the DU 104. In some embodiments, the process 300 may include a step 306 in which the DU 104 receives a second portion of the requested user data conveyed by the RU 102 over a second path from a source port of the RU 102 to a destination port of the DU 104. The source port of the second path may be one of the first and second source ports of the RU 102. The destination port may be one of the first and second destination ports of the DU 104. The second path may be different than the first path.

In some embodiments, the transport path group may include the address of the second source port of the RU 102 (e.g., as in the examples of FIGS. 2B, 2D, and 2E). In some embodiments in which the transport path group includes the address of the second source port of the RU 102, the second path may be from the second source port of the RU 102 to the first destination port of the DU 104. In some embodiments in which the transport path group includes the address of the second source port of the RU 102, the transport path group may further include the address of the second destination port of the DU (e.g., as in the examples illustrated in FIGS. 2D and 2E), and the second path may be from the second source port of the RU 102 to the second destination port of the DU 104. In some embodiments, the process 300 may include the DU 104 receiving a third portion of the requested user data conveyed by the RU 102 over a third path from the first source port of the RU 102 to the second destination port of the DU. In some embodiments, the process 300 may include the DU 104 receiving a fourth portion of the requested user data conveyed by the RU 102 over a fourth path from the second source port of the RU 102 to the first destination port of the DU 104.

In some embodiments, the transport path group may include the address of the second destination port of the DU 104 (e.g., as in the examples illustrated in FIGS. 2C-2E), and the second path may be from the first source port of the RU 102 to the second destination port of the DU 104.

In some embodiments, the transport path group may include the flow identifier, such as a VLAN (e.g., as in the examples illustrated in FIGS. 2E and 2F). In some embodiments, the flow identifier may subdivide the first portion of the requested user data on the first path between a first switch (e.g., switch 208B1) and a second switch (e.g., switch 208B1).

In some embodiments, the first path may be through a first switch (e.g., switch 208B1) but not a second switch (e.g., switch 208B1), and the second path may be through the second switch but not the first switch (e.g., as in the example illustrated in FIG. 2E). In some embodiments, the second path may be from the second source port of the RU 102, through the second switch, and to the second destination portion of the DU 104. In some embodiments, the second switch may serve more RUs 102 than the first switch, and the first portion of the requested user data conveyed by the RU 102 over the first path through the first switch may be larger than the second portion of the requested user data conveyed by the RU 102 over the second path through the second switch. In some embodiments, the first and second switches may be Ethernet switches.

In some embodiments, the first and second portions of the requested user data may be received at the same rate. In some alternative embodiments, the first portion of the requested user data may be received at a different rate than the rate at which the second portion of the requested used data is received.

In some embodiments, the RU 102 may be a first RU, and the method may include conveying a request for second user data to a second RU 102. The request for second user data may identify a second transport path group. The second transport path group may include (i) an address of a first source port of the second RU 102, (ii) the address of the first destination port of the DU 104, and (iii) an address of a second source port of the second RU 102, the address of the second destination port of the DU 104, and/or a flow identifier (e.g., a VLAN). The second source port of the second RU 102 may be a different source port of the second RU 102 than the first source port of the second RU 102. The process 300 may include the DU 104 receiving a first portion of the requested second user data conveyed by the second RU 102 over a first path from the first source port of the second RU 102 to the first destination port of the DU 104. The process 300 may include the DU 104 receiving a second portion of the requested second user data conveyed by the second RU 102 over a second path from a source port of the second RU 102 to a destination port of the DU 104. The source port of the second path may be one of the first and second source ports of the second RU 102. The destination port may be one of the first and second destination ports of the DU 104, and the second path may be different than the first path.

In some embodiments, the process 300 may include the DU 104 conveying a configuration for the transport path group to the RU 102 (e.g., under a hierarchical M-plane model). In some embodiments in which the DU 104 serves multiple RUs 102, the process 300 may include the DU 104 conveying a configuration for a second transport path group to a second RU 102. In some embodiments, the process 300 may include the DU 104 receiving a configuration for the transport path group, and the configuration for the transport path group may have been conveyed by a management node 106.

In some embodiments, the process 300 may include conveying load balancing parameters for the transport path group to the RU 102. In some embodiments, the load balancing parameters may include relative bitrates for the first and second paths. In some embodiments, the load balancing parameters may include load balancing weights for the first and second paths.

Figure 4:
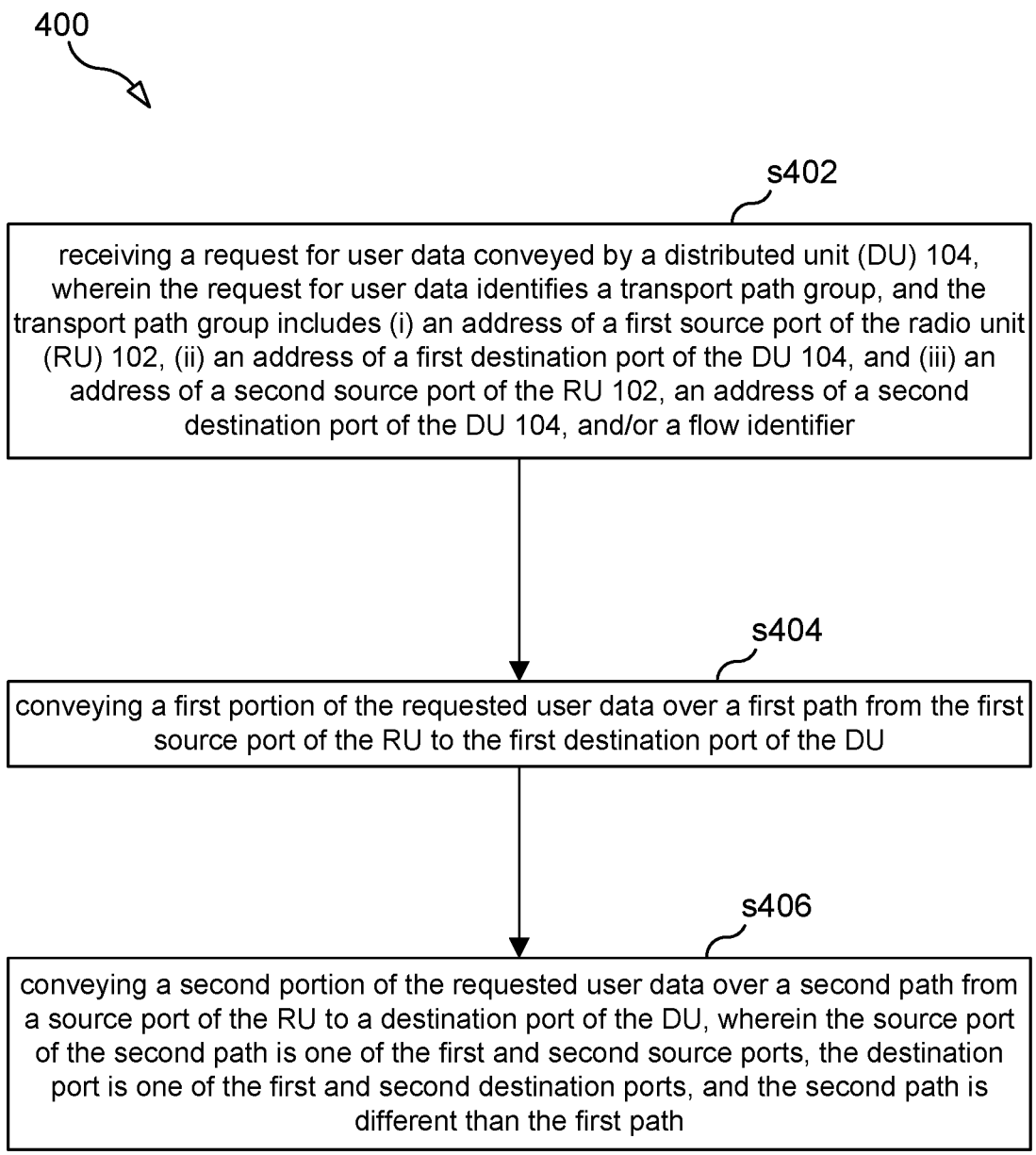
FIG. 4 is a flowchart illustrating a process according to some embodiments.

FIG. 4 illustrates a process 400 performed by a radio unit (RU) 102. In some embodiments, the RU 102 may be connected to a distributed unit (DU) 104 over a fronthaul interface. In some embodiments, the DU 104 may be a baseband unit.

In some embodiments, the process 400 may include a step 402 in which the RU 102 receives a request for user data conveyed by the DU 104. The request for user data may identify a transport path group. In some embodiments, the request for user data may include an identification of the transport path group. In some embodiments, the request for user data may include an extended antenna-carrier (eAxC) identification (ID). In some embodiments, a transport path group may be associated with the eAxC ID, and the eAxC ID may identify the transport path group that is associated with the eAxC ID. In some embodiments, the request for user data may include a data associated control message.

The transport path group may include (i) an address of a first source port of the RU, (ii) an address of a first destination port of the DU, and (iii) an address of a second source port of the RU, an address of a second destination port of the DU, and/or flow identifier. In some embodiments, the flow identifier may be, for example, a virtualized local area network (VLAN). The second source port may be a different source port of the RU than the first source port. The second destination port may be a different destination port of the DU than the first destination port. In some embodiments, the addresses of the first and second source ports of the RU and the first and second destination ports of the DU may be Internet Protocol (IP) addresses or media access control (MAC) addresses.

In some embodiments, the process 400 may include a step 404 in which the RU 102 conveys a first portion of the requested user data over a first path from the first source port of the RU 102 to the first destination port of the DU 104. The process 400 may include a step 406 in which the RU 102 conveys a second portion of the requested user data over a second path from a source port of the RU 102 to a destination port of the DU 104. The source port of the second path may be one of the first and second source ports. The destination port may be one of the first and second destination ports. The second path may be different than the first path.

In some embodiments, the RU 102 may distribute the requested data evenly over multiple paths from the RU 102 to the DU 104, and the multiple paths may include the first and second paths. In some embodiments, the process 400 may include receiving multiple requests for user data from the DU 104, the RU 102 may distribute the user data requested by the multiple requests over multiple paths from the RU 102 to the DU 104, and the multiple paths may include the first and second paths.

In some embodiments, the transport path group may include the address of the second source port of the RU 102 (e.g., as in the examples illustrated in FIGS. 2B, 2D, and 2E). In some embodiments in which the transport path group includes the address of the second source port of the RU 102, the second path may be from the second source port of the RU 102 to the first destination port of the DU 104. In some embodiments in which the transport path group includes the address of the second source port of the RU 102, the transport path group may further include the address of the second destination port of the DU 104 (e.g., as in the examples illustrated in FIGS. 2D and 2E), and the second path may be from the second source port of the RU 102 to the second destination port of the DU 104. In some embodiments, the process 400 may include the RU 102 conveying a third portion of the requested user data over a third path from the first source port of the RU 102 to the second destination port of the DU 104. In some embodiments, the process 400 may include the RU 102 conveying a fourth portion of the requested user data over a fourth path from the second source port of the RU 102 to the first destination port of the DU 104.

In some embodiments, the transport path group may include the address of the second destination port of the DU 104 (e.g., as in the examples illustrated in FIGS. 2C-2E), and the second path may be from the first source port of the RU 102 to the second destination port of the DU 104.

In some embodiments, the transport path group may include the flow identifier, such as a VLAN (e.g., as in the examples illustrated in FIGS. 2E and 2F). In some embodiments, the flow identifier may subdivide the first portion of the requested user data on the first path between a first switch (e.g., switch 208B1) and a second switch (e.g., switch 208B2).

In some embodiments, the first path may be through a first switch (e.g., switch 208B1) but not a second switch (e.g., switch 208B2), and the second path may be through the second switch but not the first switch (e.g., as in the example illustrated in FIG. 2E). In some embodiments, the second path may be from the second source port of the RU 102, through the second switch, and to the second destination portion of the DU 104. In some embodiments, the second switch may serve more RUs 102 than the first switch, and the first portion of the requested user data conveyed by the RU 102 over the first path through the first switch may be larger than the second portion of the requested user data conveyed by the RU 102 over the second path through the second switch. In some embodiments, the first and second switches may be Ethernet switches.

In some embodiments, the first and second portions of the requested user data may be conveyed at the same rate. In some alternative embodiments, the first portion of the requested user data may be conveyed at a different rate than the rate at which the second portion of the requested used data is conveyed.

In some embodiments, the process 400 may include receiving a configuration for the transport path group. In some embodiments, the configuration for the transport path group may have been conveyed by the DU 104 (e.g., under a hierarchical M-plane model). In some alternative embodiments, the configuration for the transport path group may have been conveyed by a management node 106 (e.g., under a hybrid M-plane model).

In some embodiments, the process 400 may include using load balancing parameters to convey the first and second portions of the requested user data over the first and second paths, respectively, from the RU 102 to the DU 104. In some embodiments, the load balancing parameters may be default parameters. In some alternative embodiments, the process 400 may include receiving the load balancing parameters for the transport path group. In some alternative embodiments, the process 400 may include determining the load balancing parameters for the transport path group. In some embodiments, the load balancing parameters may include relative bitrates for the first and second paths. In some embodiments, the load balancing parameters may additionally or alternatively include load balancing weights for the first and second paths.

In some embodiments, the process 400 may include the RU 102 determining that a single path would be insufficient to convey the requested user data during a transmission window, the first and second data portions may be conveyed over the first and second paths, respectively, in response to determining that a single path would be insufficient to convey the requested user data during the transmission window. In some embodiments, determining that a single path would be insufficient to convey the requested user data during the transmission window may include determining that a data rate of one or more source ports of the RU 102 is insufficient to convey the requested user data during the transmission window.

Figure 5:
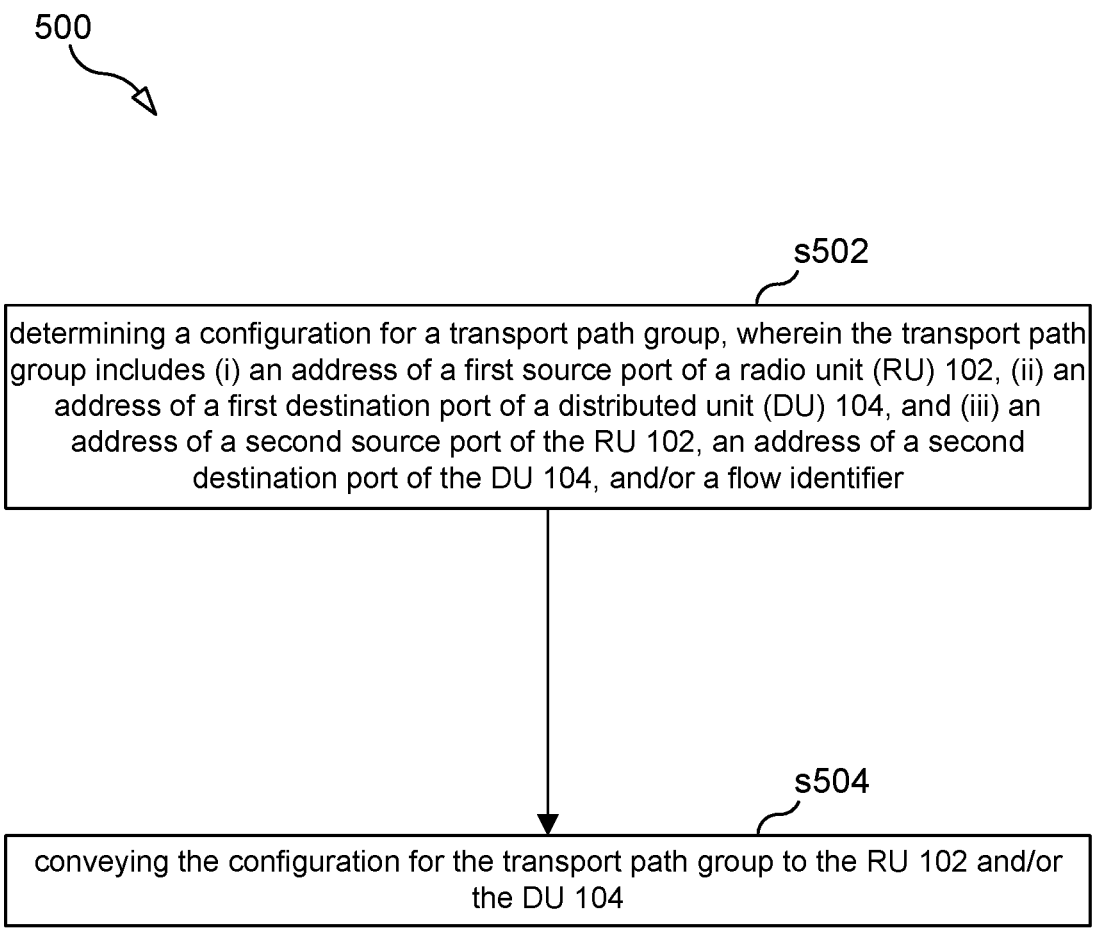
FIG. 5 is a flowchart illustrating a process according to some embodiments.

FIG. 5 illustrates a process 500 performed by a management node 106. In some embodiments, the management node 106 may communicate with the RU 102 and/or DU 104 over a management plane (M-plane).

In some embodiments, the process 500 may include a step 502 in which the management node 106 determines a configuration for a transport path group. The transport path group may include (i) an address of a first source port of an RU 102, (ii) an address of a first destination port of a DU 104, and (iii) an address of a second source port of the RU 102, an address of a second destination port of the DU 104, and/or flow identifier. In some embodiments, the flow identifier may be a virtualized local area network (VLAN). The second source port may be a different source port of the RU 102 than the first source port. The second destination port may be a different destination port of the DU 104 than the first destination port.

In some embodiments, the process 500 may include a step 504 in which the management node 106 conveys the configuration for the transport path group to the RU 102 and/or the DU 104. In some embodiments, the management node 106 may convey the configuration for the transport path group to the RU 102 directly (e.g., under a hybrid M-plane model) or indirectly (e.g., via a DU 104 under a hierarchical M-plane model).

Figure 6:
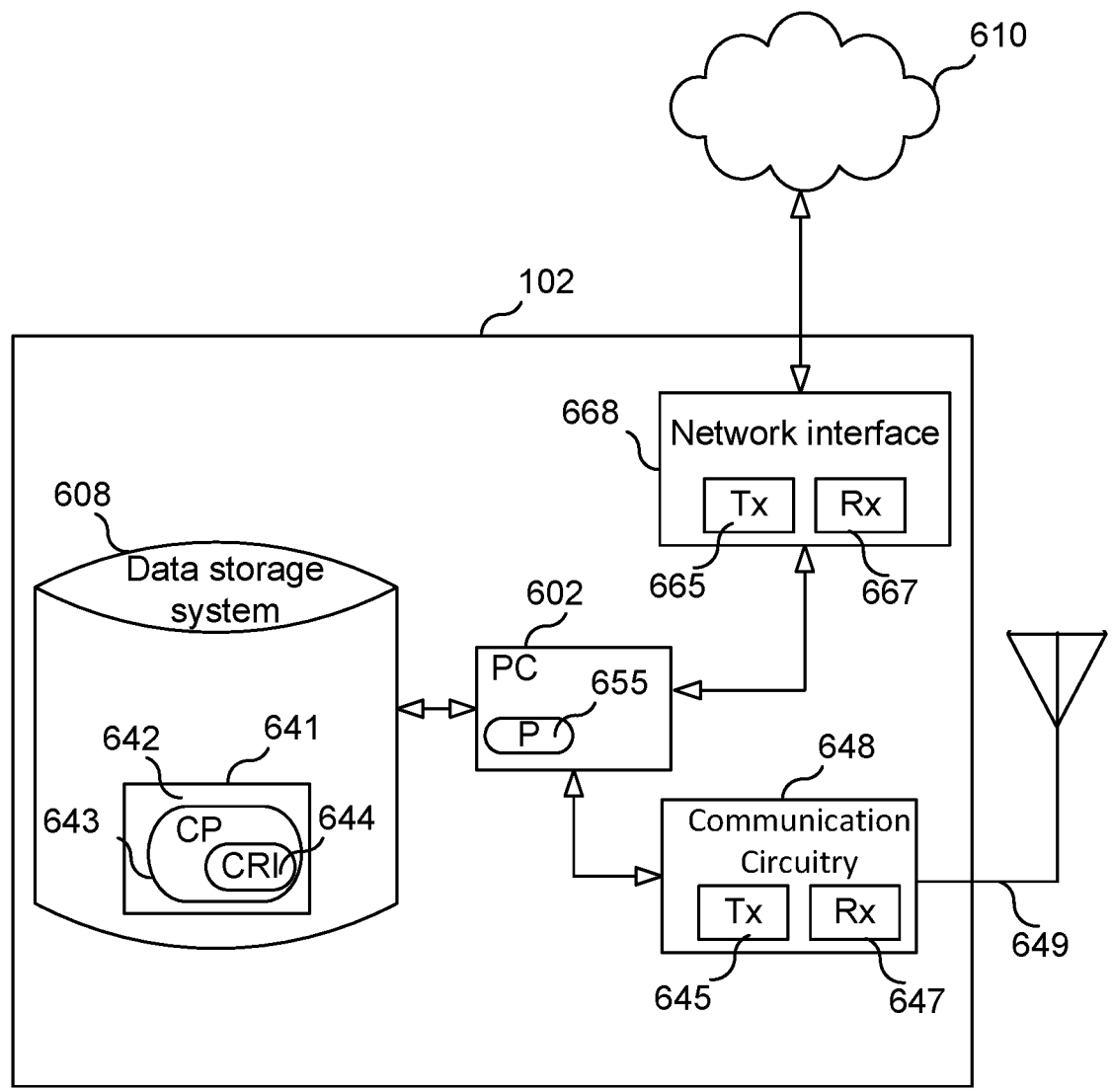
FIG. 6 illustrates a radio unit according to some embodiments.

FIG. 6 is a block diagram of a radio unit (RU) 102, according to some aspects. As shown in FIG. 6, the RU 102 may comprise: processing circuitry (PC) 602, which may include one or more processors (P) 655 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., the RU 102 may be a distributed computing apparatus); a network interface 668 comprising a transmitter (Tx) 665 and a receiver (Rx) 667 for enabling the RU 102 to transmit data to and receive data from other nodes (e.g., a distributed unit (DU) 104 and/or a management node 106) connected to a network 610 (e.g., a fronthaul interface) to which network interface 668 is connected; communication circuitry 648, which is coupled to an antenna arrangement 649 including one or more antennas and which comprises a transmitter (Tx) 645 and a receiver (Rx) 647 for enabling the RU 102 to transmit data and receive data (e.g., wirelessly transmit/receive data); and a local storage unit (a.k.a., "data storage system") 608, which may include one or more non-volatile storage devices and/or one or more volatile storage devices. In aspects where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some aspects, the CRI 644 of computer program 1843 is configured such that when executed by PC 602, the CRI causes the RU 102 to perform steps described herein (e.g., steps described herein with reference to the flow chart of FIG. 3). In other aspects, the RU 102 may be configured to perform steps described herein without the need for code. That is, for example, PC 602 may consist merely of one or more ASICs. Hence, the features of the aspects described herein may be implemented in hardware and/or software.

Figure 7:
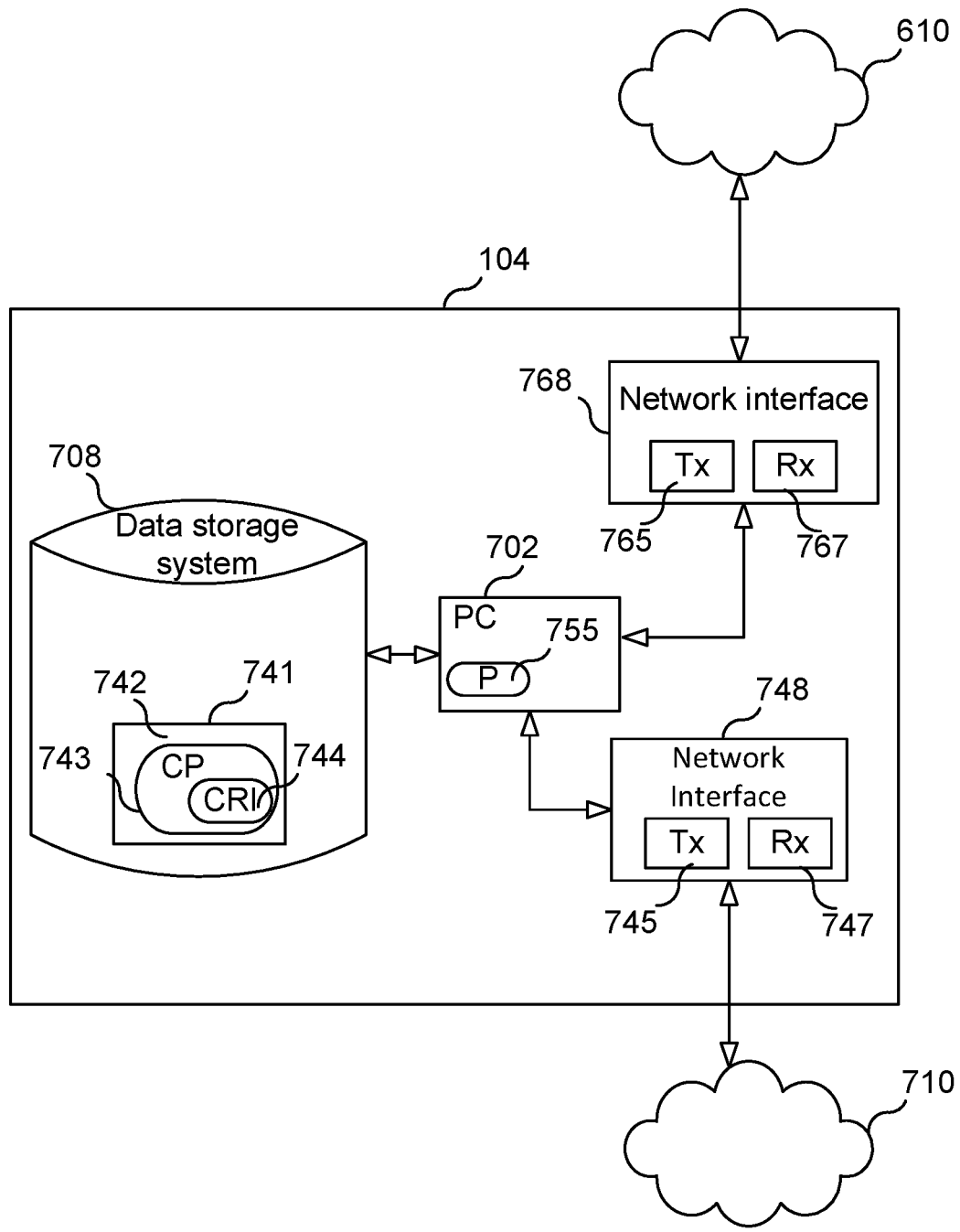
FIG. 7 illustrates a distributed unit according to some embodiments.

FIG. 7 is a block diagram of a distributed unit (DU) 104, according to some aspects. As shown in FIG. 7, the DU 104 may comprise: processing circuitry (PC) 702, which may include one or more processors (P) 755 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., the DU 104 may be a distributed computing apparatus); a first network interface 768 comprising a transmitter (Tx) 765 and a receiver (Rx) 767 for enabling the DU 104 to transmit data to and receive data from other nodes (e.g., one or more radio units (RUs) 102 and/or a management node 106) connected to the network 610 (e.g., a fronthaul interface) to which first network interface 768 is connected; a second network interface 748 comprising a transmitter (Tx) 745 and a receiver (Rx) 767 for enabling the DU 104 to transmit data to and receive data from other nodes (e.g., a centralized unit (CU) or data center) connected to the network 710 (e.g., a midhaul or backhaul interface) to which first network interface 768 is connected; and a local storage unit (a.k.a., "data storage system") 708, which may include one or more non-volatile storage devices and/or one or more volatile storage devices. In aspects where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some aspects, the CRI 744 of computer program 743 is configured such that when executed by PC 702, the CRI causes the DU 104 to perform steps described herein (e.g., steps described herein with reference to the flow chart of FIG. 4). In other aspects, the DU 104 may be configured to perform steps described herein without the need for code. That is, for example, PC 702 may consist merely of one or more ASICs. Hence, the features of the aspects described herein may be implemented in hardware and/or software. In some alternative embodiments, a single network interface may be used in place of the first and second network interfaces 768 and 748.

Figure 8:
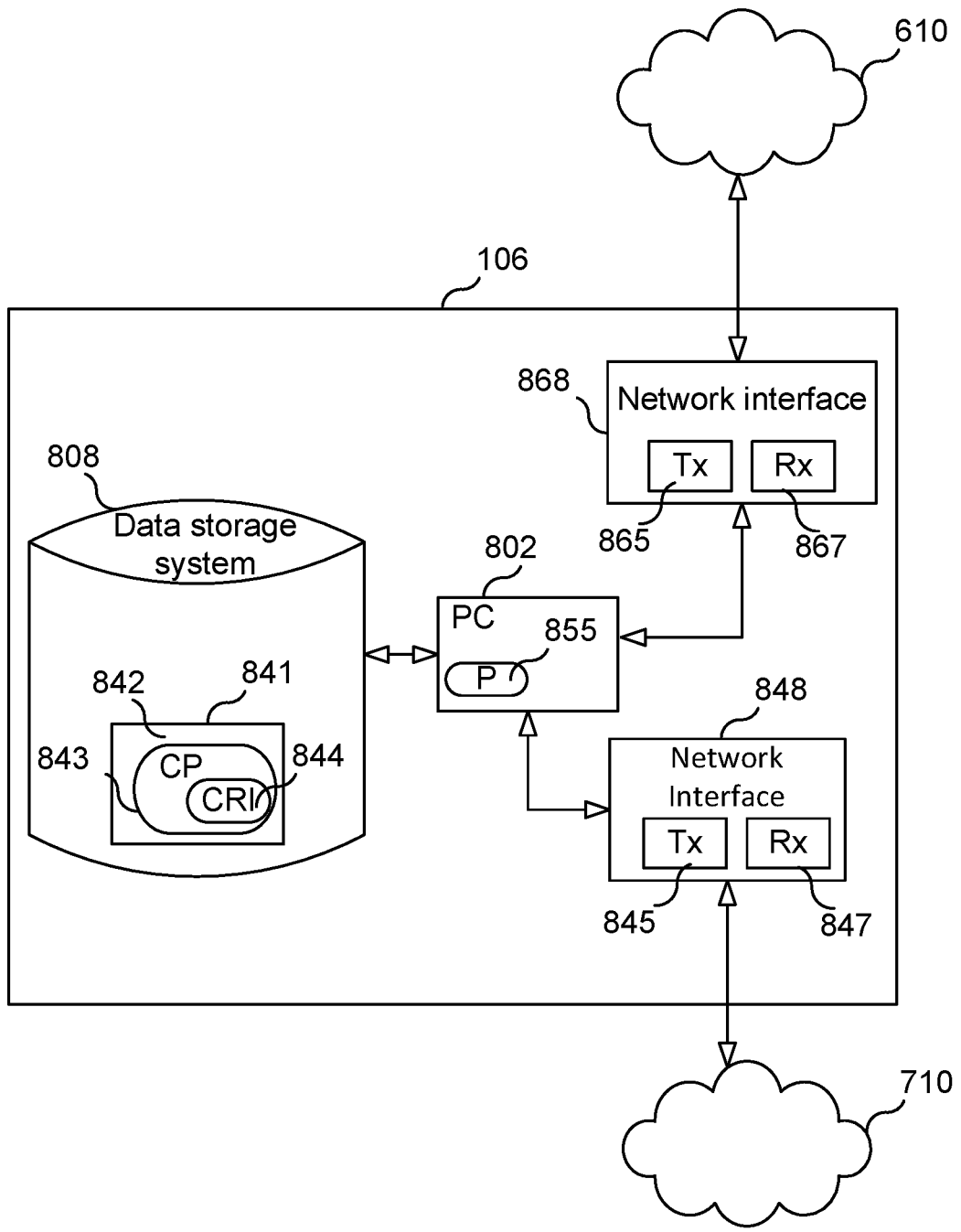
FIG. 8 illustrates a management node according to some embodiments.

FIG. 8 is a block diagram of a management node 106, according to some aspects. As shown in FIG. 8, the management node 106 may comprise: processing circuitry (PC) 802, which may include one or more processors (P) 855 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., the management node 106 may be a distributed computing apparatus); a first network interface 868 comprising a transmitter (Tx) 865 and a receiver (Rx) 867 for enabling the management node 106 to transmit data to and receive data from other nodes (e.g., one or more radio units (RUs) 102 and/or one or more distributed units (DU) 104) connected to the network 610 (e.g., a fronthaul interface) to which first network interface 868 is connected; a second network interface 848 comprising a transmitter (Tx) 845 and a receiver (Rx) 867 for enabling the management node 106 to transmit data to and receive data from other nodes (e.g., a centralized unit (CU) or data center) connected to the network 710 (e.g., a midhaul or backhaul interface) to which first network interface 868 is connected; and a local storage unit (a.k.a., "data storage system") 808, which may include one or more non-volatile storage devices and/or one or more volatile storage devices. In aspects where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, magnetic media (e.g., a hard disk), optical media, memory devices (e.g., random access memory, flash memory), and the like. In some aspects, the CRI 844 of computer program 843 is configured such that when executed by PC 802, the CRI causes the management node 106 to perform steps described herein (e.g., steps described herein with reference to the flow chart of FIG. 5). In other aspects, the management node 106 may be configured to perform steps described herein without the need for code. That is, for example, PC 802 may consist merely of one or more ASICs. Hence, the features of the aspects described herein may be implemented in hardware and/or software. In some alternative embodiments, a single network interface may be used in place of the first and second network interfaces 868 and 848.

SUMMARY OF EMBODIMENTS

A1. A method performed by a distributed unit (DU) (104), the method comprising: conveying a request for user data to a radio unit (RU) (102), wherein: the request for user data identifies a transport path group, the transport path group comprises (i) an address of a first source port of the RU, (ii) an address of a first destination port of the DU, and (iii) an address of a second source port of the RU, an address of a second destination port of the DU, and/or a virtualized local area network (VLAN), the second source port is a different source port of the RU than the first source port, and the second destination port is a different destination port of the DU than the first destination port; receiving a first portion of the requested user data conveyed by the RU over a first path from the first source port of the RU to the first destination port of the DU; and receiving a second portion of the requested user data conveyed by the RU over a second path from a source port of the RU to a destination port of the DU, wherein the source port of the second path is one of the first and second source ports, the destination port is one of the first and second destination ports, and the second path is different than the first path.

A2. The method of embodiment A1, wherein the request for user data comprises a data associated control message.

A3. The method of embodiment A1 or A2, wherein the request for user data comprises an extended antenna-carrier (eAxC) identification (ID).

A4. The method of any one of embodiments A1-A3, wherein the request for user data comprises load balancing weights for the first and second paths.

A5. The method of any one of embodiments A1-A4, wherein the addresses of the first and second source ports of the RU and the first and second destination ports of the DU are Internet Protocol (IP) addresses or media access control (MAC) addresses.

A6. The method of any one of embodiments A1-A5, wherein the transport path group comprises the address of the second source port of the RU.

A7. The method of embodiment A6, wherein the second path is from the second source port of the RU to the first destination port of the DU.

A8. The method of embodiment A6, wherein the transport path group comprises the address of the second destination port of the DU, and the second path is from the second source port of the RU to the second destination port of the DU.

A9. The method of embodiment A8, further comprising receiving a third portion of the requested user data conveyed by the RU over a third path from the first source port of the RU to the second destination port of the DU.

A10. The method of embodiment A8 or A9, further comprising receiving a fourth portion of the requested user data conveyed by the RU over a fourth path from the second source port of the RU to the first destination port of the DU.

A11. The method of any one of embodiments A1-A5, wherein the transport path group comprises the address of the second destination port of the DU, and the second path is from the first source port of the RU to the second destination port of the DU.

A12. The method of any one of embodiments A1-A11, wherein the transport path group comprises the VLAN.

A13. The method of embodiment A12, wherein the VLAN subdivides the first portion of the requested user data on the first path between a first switch (208B1) and a second switch (208B2).

A14. The method of any one of embodiments A1-A13, wherein the first path is through a first switch (208B1) but not a second switch (208B2), and the second path is through the second switch but not the first switch.

A15. The method of embodiment A14, wherein the second path is from the second source port of the RU, through the second switch, and to the second destination portion of the DU.

A16. The method of embodiment A14 or A15, wherein the second switch serves more RUs than the first switch, and the first portion of the requested user data conveyed by the RU over the first path through the first switch is larger than the second portion of the requested user data conveyed by the RU over the second path through the second switch.

A17. The method of any one of embodiments A13-A16, wherein the first and second switches are Ethernet switches.

A18. The method of any one of embodiments A1-A17, wherein the first and second portions of the requested user data are received at the same rate.

A19. The method of any one of embodiments A1-A17, wherein the first portion of the requested user data is received at a different rate than the rate at which the second portion of the requested used data is received.

A20. The method of any one of embodiments A1-A19, wherein the RU is a first RU, and the method further comprises: conveying a request for second user data to a second RU (102), wherein: the request for second user data identifies a second transport path group, the second transport path group comprises (i) an address of a first source port of the second RU, (ii) the address of the first destination port of the DU, and (iii) an address of a second source port of the second RU, the address of the second destination port of the DU, and/or a VLAN, and the second source port of the second RU is a different source port of the second RU than the first source port of the second RU; receiving a first portion of the requested second user data conveyed by the second RU over a first path from the first source port of the second RU to the first destination port of the DU; and receiving a second portion of the requested second user data conveyed by the second RU over a second path from a source port of the second RU to a destination port of the DU, wherein the source port of the second path is one of the first and second source ports of the second RU, the destination port is one of the first and second destination ports of the DU, and the second path is different than the first path.

A21. The method of any one of embodiments A1-A20, further comprising conveying a configuration for the transport path group to the RU.

A22. The method of any one of embodiments A1-A21, further comprising receiving a configuration for the transport path group, wherein the configuration for the transport path group was conveyed by a management node (106).

A23. The method of any one of embodiments A1-A22, further comprising conveying load balancing parameters for the transport path group to the RU.

A24. The method of embodiment A23, wherein the load balancing parameters include relative bitrates for the first and second paths.

A25. The method of embodiment A23 or A24, wherein the load balancing parameters include load balancing weights for the first and second paths.

A26. The method of any one of embodiments A1-A26, wherein the DU is a baseband unit.

B1. A distributed unit (DU) (104) adapted to: convey a request for user data to a radio unit (RU) (102), wherein: the request for user data identifies a transport path group, the transport path group comprises (i) an address of a first source port of the RU, (ii) an address of a first destination port of the DU, and (iii) an address of a second source port of the RU, an address of a second destination port of the DU, and/or a virtualized local area network (VLAN), the second source port is a different source port of the RU than the first source port, and the second destination port is a different destination port of the DU than the first destination port; receive a first portion of the requested user data conveyed by the RU over a first path from the first source port of the RU to the first destination port of the DU; and receive a second portion of the requested user data conveyed by the RU over a second path from a source port of the RU to a destination port of the DU, wherein the source port of the second path is one of the first and second source ports, the destination port is one of the first and second destination ports, and the second path is different than the first path.

C1. A method performed by a radio unit (RU) (102), the method comprising: receiving a request for user data conveyed by a distributed unit (DU) (104), wherein: the request for user data identifies a transport path group, the transport path group comprises (i) an address of a first source port of the RU, (ii) an address of a first destination port of the DU, and (iii) an address of a second source port of the RU, an address of a second destination port of the DU, and/or a virtualized local area network (VLAN), the second source port is a different source port of the RU than the first source port, and the second destination port is a different destination port of the DU than the first destination port; conveying a first portion of the requested user data over a first path from the first source port of the RU to the first destination port of the DU; and conveying a second portion of the requested user data over a second path from a source port of the RU to a destination port of the DU, wherein the source port of the second path is one of the first and second source ports, the destination port is one of the first and second destination ports, and the second path is different than the first path.

C2. The method of embodiment C1, wherein the RU distributes the requested data evenly over multiple paths from the RU to the DU, and the multiple paths include the first and second paths.

C3. The method of embodiment C1 or C2, further comprising receiving multiple requests for user data from the DU, wherein the RU distributes the user data requested by the multiple requests over multiple paths from the RU to the DU, and the multiple paths include the first and second paths.

C4. The method of any one of embodiments C1-C3, wherein the request for user data comprises a data associated control message.

C5. The method of any one of embodiments C1-C4, wherein the request for user data comprises an extended antenna-carrier (eAxC) identification (ID).

C6. The method of any one of embodiments C1-C5, wherein the addresses of the first and second source ports of the RU and the first and second destination ports of the DU are Internet Protocol (IP) addresses or media access control (MAC) addresses.

C7. The method of any one of embodiments C1-C6, wherein the transport path group comprises the address of the second source port of the RU.

C8. The method of embodiment C7, wherein the second path is from the second source port of the RU to the first destination port of the DU.

C9. The method of embodiment C7, wherein the transport path group comprises the address of the second destination port of the DU, and the second path is from the second source port of the RU to the second destination port of the DU.

C10. The method of embodiment C9, further comprising conveying a third portion of the requested user data over a third path from the first source port of the RU to the second destination port of the DU.

C11. The method of embodiment C9 or C10, further comprising conveying a fourth portion of the requested user data over a fourth path from the second source port of the RU to the first destination port of the DU.

C12. The method of any one of embodiments C1-C6, wherein the transport path group comprises the address of the second destination port of the DU, and the second path is from the first source port of the RU to the second destination port of the DU.

C13. The method of any one of embodiments C1-C12, wherein the transport path group further comprises the VLAN.

C14. The method of embodiment C13, wherein the VLAN subdivides the first portion of the requested user data on the first path between a first switch (208B1) and a second switch (208B2).

C15. The method of any one of embodiments C1-C14, wherein the first path is through a first switch (208B1) but not a second switch (208B2), and the second path is through the second switch but not the first switch.

C16. The method of embodiment C15, wherein the second path is from the second source port of the RU, through the second switch, and to the second destination portion of the DU.

C17. The method of embodiment C15 or C16, wherein the second switch serves more RUs than the first switch, and the first portion of the requested user data conveyed by the RU over the first path through the first switch is larger than the second portion of the requested user data conveyed by the RU over the second path through the second switch.

C18. The method of any one of embodiments C14-C17, wherein the first and second switches are Ethernet switches.

C19. The method of any one of embodiments C1-C18, wherein the first and second portions of the requested user data are conveyed at the same rate.

C20. The method of any one of embodiments C1-C18, wherein the first portion of the requested user data is conveyed at a different rate than the rate at which the second portion of the requested used data is conveyed.

C21. The method of any one of embodiments C1-C20, further comprising receiving a configuration for the transport path group.

C22. The method of embodiment C21, wherein the configuration for the transport path group was conveyed by the DU.

C23. The method of embodiment C21, wherein the configuration for the transport path group was conveyed by a management node.

C24. The method of any one of embodiments C1-C23, further comprising using load balancing parameters to convey the first and second portions of the requested user data over the first and second paths, respectively, from the RU to the DU.

C25. The method of any one of embodiments C1-C24, further comprising receiving the load balancing parameters for the transport path group.

C26. The method of any one of embodiments C1-C24, further comprising determining the load balancing parameters for the transport path group.

C27. The method of any one of embodiments C24-C26, wherein the load balancing parameters include relative bitrates for the first and second paths.

C28. The method of any one of embodiments C24-C27, wherein the load balancing parameters include load balancing weights for the first and second paths.

C29. The method of any one of embodiments C1-C28, further comprising determining that a single path would be insufficient to convey the requested user data during a transmission window, wherein the first and second data portions are conveyed over the first and second paths, respectively, in response to determining that a single path would be insufficient to convey the requested user data during the transmission window.

C30. The method of embodiment C29, wherein determining that a single path would be insufficient to convey the requested user data during the transmission window comprising determining that a data rate of one or more source ports of the RU is insufficient to convey the requested user data during the transmission window.

C31. The method of any one of embodiments C1-C30, wherein the DU is a baseband unit.

D1. A radio unit (RU) (102) adapted to: receive a request for user data conveyed by a distributed unit (DU) (104), wherein: the request for user data identifies a transport path group, the transport path group comprises (i) an address of a first source port of the RU, (ii) an address of a first destination port of the DU, and (iii) an address of a second source port of the RU, an address of a second destination port of the DU, and/or a virtualized local area network (VLAN), the second source port is a different source port of the RU than the first source port, and the second destination port is a different destination port of the DU than the first destination port; convey a first portion of the requested user data over a first path from the first source port of the RU to the first destination port of the DU; and convey a second portion of the requested user data over a second path from a source port of the RU to a destination port of the DU, wherein the source port of the second path is one of the first and second source ports, the destination port is one of the first and second destination ports, and the second path is different than the first path.

E1. A method performed by a management node (106), the method comprising: determining a configuration for a transport path group, wherein: the transport path group comprises (i) an address of a first source port of a radio unit (RU) (102), (ii) an address of a first destination port of a distributed unit (DU) (104), and (iii) an address of a second source port of the RU, an address of a second destination port of the DU, and/or a virtualized local area network (VLAN), the second source port is a different source port of the RU than the first source port, and the second destination port is a different destination port of the DU than the first destination port; and conveying the configuration for the transport path group to the RU and/or the DU.

F1. A management node (106) adapted to: determine a configuration for a transport path group, wherein: the transport path group comprises (i) an address of a first source port of a radio unit (RU) (102), (ii) an address of a first destination port of a distributed unit (DU) (104), and (iii) an address of a second source port of the RU, an address of a second destination port of the DU, and/or a virtualized local area network (VLAN), the second source port is a different source port of the RU than the first source port, and the second destination port is a different destination port of the DU than the first destination port; and convey the configuration for the transport path group to the RU and/or the DU.

G1. A computer program (643, 743, 843) comprising instructions for adapting an apparatus to perform the method of any one of embodiments A1-A26, C1-C31, and E1.

H1. A carrier containing the computer program of embodiment G1, wherein the carrier is one of an electronic signal, optical signal, radio signal, or compute readable storage medium.

I1. An apparatus (102, 104, 106), the apparatus comprising: processing circuitry (602, 702, 802); and a memory (642, 742, 842), said memory containing instructions (644, 744, 844) executable by said processing circuitry, whereby said apparatus is operative to perform the method of any one of the embodiments A1-A26, C1-C31, and E1.

J1. An apparatus (102, 104, 106) adapted to perform the method of any one of embodiments A1-A26, C1-C31, and E1.

K1. Any combination of the embodiments set forth above.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method performed by a radio unit (RU), the method comprising:
   receiving a request for user data conveyed by a distributed unit (DU), wherein:
      the request for user data identifies a transport path group, and
      the transport path group comprises (i) an address of a first source port of the RU, (ii) an address of a first destination port of the DU, and (iii) an address of a second source port of the RU, an address of a second destination port of the DU, and/or a flow identifier;
   conveying a first portion of the requested user data over a first path from the first source port of the RU to the first destination port of the DU; and
   conveying a second portion of the requested user data over a second path from a source port of the RU to a destination port of the DU, wherein the source port of the second path is one of the first and second source ports, the destination port is one of the first and second destination ports, and the second path is different than the first path.

2. The method of claim 1, wherein the flow identifier is a virtualized local area network (VLAN).

3. The method of claim 1, wherein the RU distributes the requested data evenly over multiple paths from the RU to the DU, and the multiple paths include the first and second paths.

4. The method of claim 1, further comprising receiving multiple requests for user data from the DU, wherein the RU distributes the user data requested by the multiple requests over multiple paths from the RU to the DU, and the multiple paths include the first and second paths.

5. The method of claim 1, wherein the transport path group comprises the address of the second source port of the RU.

6. The method of claim 5, wherein the second path is from the second source port of the RU to the first destination port of the DU.

7. The method of claim 5, wherein the transport path group comprises the address of the second destination port of the DU, and the second path is from the second source port of the RU to the second destination port of the DU.

8. The method of claim 7, further comprising conveying a third portion of the requested user data over a third path from the first source port of the RU to the second destination port of the DU.

9. The method of claim 7, further comprising conveying a fourth portion of the requested user data over a fourth path from the second source port of the RU to the first destination port of the DU.

10. The method of claim 1, wherein the transport path group comprises the address of the second destination port of the DU, and the second path is from the first source port of the RU to the second destination port of the DU.

11. The method of claim 1, wherein the transport path group comprises the flow identifier.

12. The method of claim 11, wherein the flow identifier subdivides the first portion of the requested user data on the first path between a first switch and a second switch.

13. The method of claim 1, wherein the first path is through a first switch but not a second switch, and the second path is through the second switch but not the first switch.

14. The method of claim 13, wherein the second path is from the second source port of the RU, through the second switch, and to the second destination portion of the DU.

15. The method of claim 13, wherein the second switch serves more RUs than the first switch, and the first portion of the requested user data conveyed by the RU over the first path through the first switch is larger than the second portion of the requested user data conveyed by the RU over the second path through the second switch.

16. The method of claim 1, further comprising using load balancing parameters to convey the first and second portions of the requested user data over the first and second paths, respectively, from the RU to the DU.

17. The method of claim 1, further comprising determining that a single path would be insufficient to convey the requested user data during a transmission window, wherein the first and second data portions are conveyed over the first and second paths, respectively, in response to determining that a single path would be insufficient to convey the requested user data during the transmission window.

18. The method of claim 17, wherein determining that a single path would be insufficient to convey the requested user data during the transmission window comprising determining that a data rate of one or more source ports of the RU is insufficient to convey the requested user data during the transmission window.

19. A radio unit (RU) comprising:
   processing circuitry;
   a network interface; and
   a data storage system;
   wherein the RU is configured to:
   receive a request for user data conveyed by a distributed unit (DU), wherein:
      the request for user data identifies a transport path group, and
      the transport path group comprises (i) an address of a first source port of the RU,
   (ii) an address of a first destination port of the DU, and (iii) an address of a second source port of the RU, an address of a second destination port of the DU, and/or a flow identifier;
   convey a first portion of the requested user data over a first path from the first source port of the RU to the first destination port of the DU; and
   convey a second portion of the requested user data over a second path from a source port of the RU to a destination port of the DU, wherein the source port of the second path is one of the first and second source ports, the destination port is one of the first and second destination ports, and the second path is different than the first path.

20. The RU of claim 19, wherein the flow identifier is a virtualized local area network (VLAN).

* * * * *